United States Patent [19]
Chaffee

[11] Patent Number: 4,553,241
[45] Date of Patent: Nov. 12, 1985

[54] LASER TUBE STRUCTURE

[75] Inventor: Edwin G. Chaffee, Salt Lake City, Utah

[73] Assignee: Laser Corporation, Salt Lake City, Utah

[21] Appl. No.: 514,701

[22] Filed: Jul. 18, 1983

[51] Int. Cl.$^4$ .............................................. H01S 3/03
[52] U.S. Cl. ........................................ 372/62; 372/63
[58] Field of Search ...................... 372/61, 62, 63, 87

[56] References Cited

U.S. PATENT DOCUMENTS

| | | | |
|---|---|---|---|
| 3,624,543 | 11/1971 | Rockwell | 331/94.5 |
| 3,670,262 | 6/1972 | Hallock et al. | 372/62 |
| 3,763,442 | 10/1973 | McMahan | 331/94.5 |
| 4,376,328 | 3/1983 | Mefferd | 445/28 |
| 4,378,600 | 3/1983 | Hobart | 372/62 |
| 4,380,077 | 4/1983 | McMahan | 372/62 |
| 4,477,907 | 10/1984 | McMahan | 372/55 |
| 4,481,633 | 11/1984 | McMahan | 372/62 |

Primary Examiner—James W. Davie
Attorney, Agent, or Firm—B. B. Olive

[57] ABSTRACT

A plurality of thin wall ceramic-metal segments are brazed together alternately with pairs of metal sealing rings to form a gas laser tube assembly. Within each segment there is mounted a refractory metal disc with a central hole. The series of holes formed in the discs define the discharge bore and gas return paths are formed in the wall of the segments.

9 Claims, 5 Drawing Figures

LASER TUBE STRUCTURE

TECHNICAL FIELD

This invention relates to lasers and more particularly relates to a laser tube structure made up of a plurality of uniquely constructed ceramic-metal segments brazed together.

BACKGROUND ART

Previous testing of argon-ion laser tubes made entirely of alumina showed ceramic failure or fracturing at levels of discharge current below those for which entirely satisfactory laser products can be made. The fracturing of a cylindrical, ceramic tube which has a source of heat on its inside diameter and a cooling sink on its outside diameter is caused by differential stress which develops across the cross section. The cooling sink can be established, for example, by a water jacket or air-cooled fins. It is known that the magnitude of the stress is proportional to the thermal conductivity, the heat flux density, and the dimensions of the part. When the stress exceeds the strength of the ceramic material, fracturing failure occurs. For a specific material, such as alumina, and a specific application, factors such as thermal conductivity, yield stress, and heat flux density are defined. Larger diameters and thinner wall thicknesses are known to minimize stress for a given flux density. However, other heat transfer and mechanical considerations are introduced.

An alternative to use of alumina is to use beryllia which has much better thermal conductivity and can be operated to a much higher power level without fracture. Beryllia, however, is far more expensive than alumina and is also toxic. While the toxicity problem can be circumvented by proper design and processing, the disadvantage of costs has not been overcome and the possibility of doing so is slight. There has, therefore, been significant effort to use alumina in conjunction with metals to improve the overall thermal capacity of an alumina system. This effort, however, leads to still further complex considerations of thermal impedance, mechanical rigidity and strength, wear performance, sealing, electrolysis, ionization in the gas return paths, longitudinal expansion, ease of production and quality control.

As further background, it has also been known to construct laser tubes as a continuous thick wall tube having a central discharge bore and gas return bores spaced radially outward from the discharge bore. Another form of construction has been to construct the laser tube from relatively thick wall segments with mating faces and aligned bores which provide the discharge and gas return bores. U.S. Pat. No. 3,670,262 illustrates such a segment-type construction. However, it has not been known to construct the laser tube from thin wall segments interfaced together, with the gas return bores formed in the thin walls of the segments and the gas discharge bore defined by apertures in refractory metal discs supported in the segments.

As a further aspect of the prior art, it has also been known to provide a continuous tube with a series of refractory metal discs centrally mounted on longitudinally-spaced annular metal supports. The main discharge bore was defined by holes in the center of the refractory metal discs and the gas return paths were defined by holes in the annular metal supports. However, such a single continuous tube construction has not proven to be practical in actual operation because of, among other reasons, not providing sufficient isolation between the main discharge bore and the gas return paths.

With the foregoing background and practical considerations in mind, the present invention is directed to providing a significantly improved segmented ceramic-metal laser tube construction. The improved tube construction is aimed at dealing with the mentioned operating and production considerations in a practical way and while primarily intended for use in water-jacketed, argon-ion lasers, the improved tube construction is also anticipated to find application in other types of laser tubes having fin-type cooling. The achieving of these and other objects will thus become apparent as the description proceeds.

DISCLOSURE OF INVENTION

An improved laser tube particularly adapted for use in argon-ion lasers is provided. The improved tube construction in a preferred embodiment as described and illustrated is made of segments which are brazed together. Each segment has a selected number of gas return paths which mate with the gas return paths of other segments. Each segment mounts an internal, thin-walled, metallic cup member, the rim of which is brazed to the ceramic. The cup member in turn mounts a disc made of refractory metal, such as tungsten, and having a bore through which the laser discharge passes. The segments after being formed as subassemblies are then joined together by brazed, radially-spaced, concentric metallic rings with the gas discharge bore and gas return paths aligned. The rings may be either metallizing bands or preferably extremely thin copper rings. One ring seals off the discharge. The other ring seals the vacuum-water interface when a water-jacketed type tube is being employed or the vacuum-air interface when an air-fin cooled type tube is being employed. Between the rings a plurality of gas holes in the segments associated with the gas return paths serve to vent the interface and as a dual function provide gas return paths between the anode and cathode. In this way, when a water-jacketed tube is being employed, no electrode contacts the water and electrolysis is prevented.

Although the preferred embodiment of the invention is a water-jacketed tube, cooling fins may be brazed to the segment subassemblies and for this application the individual segments are metallized on the outer peripheral surface. The fins are interrupted at selected intervals to avoid longitudinal expansion problems with the housing material surrounding the fins.

BEST MODE FOR CARRYING OUT THE INVENTION

Figure 1:
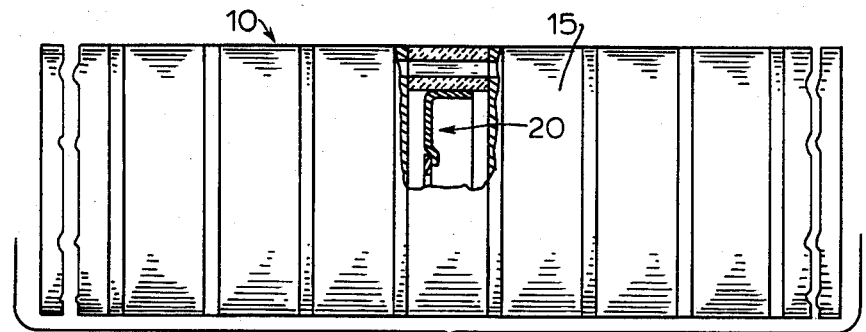
FIG. 1 is a longitudinal, fragmentary, side elevation view illustrating a laser tube structure according to the invention.
Figure 2:
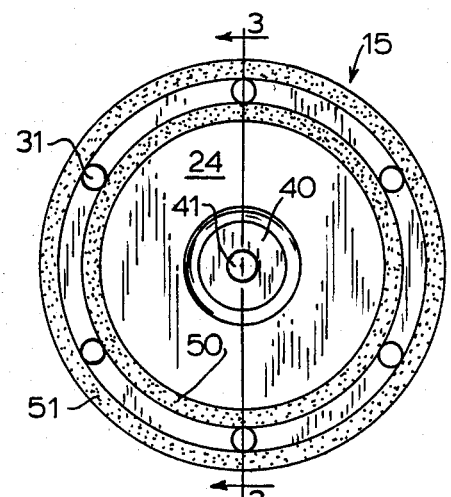
FIG. 2 is a plan view of one of the ceramic-metal subassemblies employed in the invention.
Figure 3:
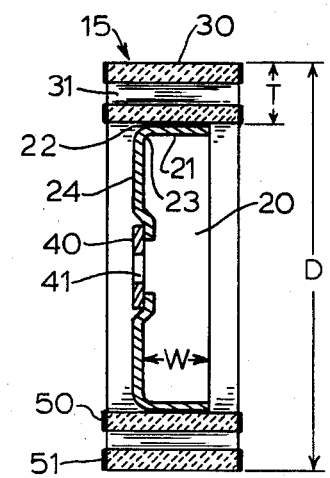
FIG. 3 is a section view taken substantially along line 3—3 of FIG. 2.
Figure 4:
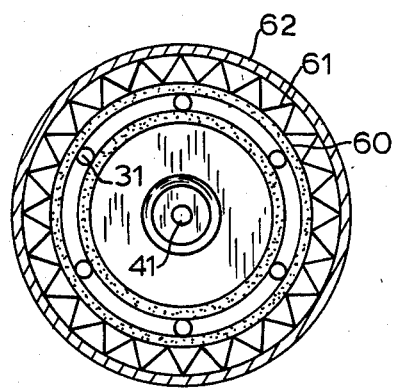
FIG. 4 is a reduced end view of the FIG. 2 segment further illustrating how cooling fins may be incorporated with the individual segment subassemblies.
Figure 5:
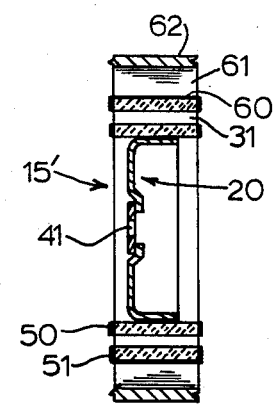
FIG. 5 is a reduced section view of a fin-equipped tube segment adapted to an alternative embodiment of the invention.

A water-jacketed and water-cooled argon-ion laser tube 10 is used by way of example in a first embodiment in reference to FIGS. 1-3. FIGS. 4 and 5 are later referred to and used to illustrate a second air-cooled embodiment. The usual cathode and electrode assemblies at the end of the tube have been eliminated as well as vacuum, cooling and power equipment and other housing structure surrounding the tube to simplify the description.

Tube 10 is made up of a plurality of individual, cylindrical segment subassemblies 15, the number and size of which will vary with the type laser to which the invention construction is applied. Each subassembly 15 comprises a thin, round, metallic cup member 20, a ceramic segment 30 and a refractory metal disc 40. Cup member 20 is preferably formed of a metal with excellent heat conductive properties such as copper of a thickness of about 0.030 inches. Segment 30 is formed of a suitable ceramic such as alumina or beryllia and disc 40 is formed of a refractory metal such as tungsten or molybdenum.

The rim 21 of cup member 20 is interfaced to the ceramic segment 30 by a suitable alloy braze 22 to ensure good thermal transfer. The rim width W is selected to ensure sufficient braze area and minimum thermal impedance across the braze joint. The rim is contoured at 23 into the central disc portion 24 with an appropriate radius to further weaken the cup member mechanically and thereby, in conjunction with the cup member's relatively thin wall, minimize opportunity for either ceramic or metal fracture. It is recognized that excessive thermal impedance is introduced if cup member 20 is too thin and if too thick introduces the possibility of cup member 20 having enough mechanical strength to break the braze 22. Thus, it has been found that if cup member 20 is made of copper of about 0.030 inches thickness and constructed as described an essentially ideal operating condition and design compromise between necessary strength as well as weakness is achieved.

The series of discs 40 confine the plasma and define the bore 41, typically 0.055 inch to 0.157 inch, through which the laser discharge takes place under vacuum conditions established in tube 10. Each disc 40 and the laser discharge are thus in thermal contact during operation of the laser. Discs 40 by reason of being made of a refractory metal material are also designed to withstand intense ion bombardment without melting and to efficiently transfer the heat to the cup members 24. Disc 40 is brazed to cup member 20 in the arrangement illustrated in FIGS. 1-3. Refractory metals are particularly suitable for high temperature applications and have superior dimensional stability and wear performance under extreme bombardment conditions. Heat transfered to the refractory metal disc 40 by the laser discharge is thus transferred to the disc portion 24 of cup member 20 and then through rim 21 and braze 22. The transferred heat then passes through the ceramic material comprising the wall thickness T. The thickness T is preferably in the range of 0.062 inch to 0.250 inch for an outer diameter D of within about 1 to 2 inches. The heat emitted by the outer wall surface of cup member 20 is finally transferred to the cooling medium such as water in the case of a water-jacketed tube being used for illustration as the first embodiment.

The ceramic segments 30 have a number of bores 31 defining gas return paths which are aligned from segment to segment as are the bores 41 comprising the main laser discharge bore. A unique sealing arrangement is used to join one segment 30 to another segment and which will be referred to as a double concentric ring seal technique. In a water-jacketed type tube application, one inner ring 50 seals off the discharge and the other outer ring 51 seals the vacuum-water interface. Between the rings 50, 51, the plurality of gas holes 31 vent the interface, and as a dual function, provide gas return paths between the anode and cathode. In this way, no electrode contacts the water and electrolysis is prevented.

The rings 50, 51 may be either metallizing bands on the ceramic or, in the preferred embodiment and as intended to be illustrated in the drawings, thin copper rings. Copper has the advantage of equalizing thermal stress around the bore 41, conveying the heat flux across part of the radial path, and facilitating the brazing process. The optimum thickness of each ring 50, 51 is about 0.030 inch which is consistent with the mechanical strength of the material involved. Ionization of the gas in the gas return holes is prevented by providing a cross-sectional area for each hole smaller than that of the laser bore.

Making reference to FIGS. 4 and 5, the basic ceramic-metal subassembly, previously described, is also suited to a fin-cooled type construction such as illustrated in FIGS. 4 and 5. In FIGS. 4 and 5, an outer metallized surface 60 is provided on each segment 15' to which the fins 61 are secured and are mounted within a suitable housing 62. The fins 61 mounted on one segment are aligned with the fins 61 on any mating interfaced segment. In use, cooling air is blown lengthwise on the fins and through housing 62 from a cooling air source, not shown.

In an alternative construction, not shown, the air fin structure can be added after the segments are bonded together to form a composite laser tube. In this form of cooling structure, a cooling fin structure can be added to all of the segments or to a series of segments spaced from other series of segments forming the tube.

During assembly, those skilled in the art will appreciate that the brazing alloy used, for example, to secure disc 40 to cup member 21 as well as the brazing alloy used for braze 22 and for securing rings 50-51 to the segments 30 should all be selected so as to not only minimize thermal impedance but also to assure that the first subassembly braze does not reflow when various subassemblies 15 or 15' are secured together. A silver alloy such as palcusil 16 is preferred.

In summary, there has thus been provided an improved laser tube construction having at least these advantages:

(1) A minimum tendency to fracture either the metal or ceramic components.

(2) Excellent dissipation of heat from the discharge bore to the surrounding cooling medium, whether water or air.

(3) Economical manufacturing cost and the ability to use the less expensive alumina as contrasted to the more expensive beryllia though adapted to both.

(4) Ease of inspecting braze joints for quality.

(5) Prevention of electrolysis when applied in a water-jacketed type laser.

(6) Ionization of gas in the gas return holes is prevented.

(7) Generally adapted to both water and air-cooled type lasers.

(8) The ability to achieve a thin wall composite laser tube with gas return paths formed in the wall of the tube.

What is claimed is:

1. A gas laser tube, comprising:
   (a) a plurality of axially-aligned, elongated, thin wall, cylindrical segments of electrically-insulating material successively disposed between electrodes at anode and cathode ends in hermetically-bonded relationship with one another and forming an outer wall of the laser tube, each said cylindrical segment defining within the wall thereof an axial longitudinal cylindrical cavity aligned with the said axial longitudinal cavity of each other said cylindrical segment, each said cylindrical segment further defining through the wall thereof a plurality of off-axis longitudinal circular holes therethrough in gas communicating relationship and aligned with the said off-axis longitudinal holes of each other said cylindrical segments to establish a corresponding plurality of elongated cylindrical gas return paths;
   (b) a thin metallic support member within each said cavity of each said segment, said support member having an outer peripheral portion located between the sides of said segment and bonded to the wall surface of said segment surrounding said cavity and integral with said peripheral portion a disc portion having an axial aperture therein and aligned with the said axial aperture of each other said cylindrical segments;
   (c) a refractory metal disc secured to one side of each said disc portion concentric with and over said axial aperture and having an axial opening therethrough defining an axial bore for the laser discharge and aligned with the said axial opening of each other said refractory metal disc, the cross sectional area of said axial openings being circular and greater than the cross sectional area of said holes; and
   (d) metallic securing means disposed between and bonded to the facing end surfaces of adjacent ones of said cylindrical segments in a manner precluding establishment of an electrical path between either electrode associated with said laser and any cooling medium flowing external of the tube while allowing gas communication between said holes at each interfacing pair of segments and in a further manner of hermetically sealing said gas in said holes from said discharge.

2. A gas laser tube as claimed in claim 1 wherein:
   (a) said segments are made of alumina;
   (b) said support members are made of copper; and
   (c) said refractory metal disc is made of tungsten.

3. A gas laser tube as claimed in claim 1 including a cooling fin structure mounted on the outer surface of each said cylindrical segment and longitudinally aligned with the said fin structure of each other said cylindrical segments.

4. A gas laser tube as claimed in claim 1 wherein said support member is cup-shaped with an integral rim forming the said peripheral portion thereof.

5. A gas laser tube as claimed in claim 4 wherein said support member is made of copper.

6. A gas laser tube as claimed in claim 5 wherein said copper is of about 0.30 inch thickness.

7. A gas laser tube as claimed in claim 1 wherein said axial opening in said refractory metal disc is round and has a diameter within the range of 0.055 to 0.157 inch.

8. A gas laser tube as claimed in claim 7 wherein the thickness of the wall of each said cylindrical segment is within the range of 0.062 to 0.250 inch and the outside diameter of each said cylindrical segment is within the range of one to two inches.

9. A gas laser tube as claimed in claim 1 wherein:
   (a) said segments are made of a material selected from the group consisting of alumina and beryllia;
   (b) said support members are made of copper and are cup-shaped with an integral cylindrical rim forming the said peripheral portion thereof;
   (c) said refractory metal disc is made of tungsten; and
   (d) said metallic securing means comprise copper rings.

* * * * *